United States Patent [19]

Deininger

[11] Patent Number: 5,027,856

[45] Date of Patent: Jul. 2, 1991

[54] ELECTROHYDRAULIC SIGNAL CONVERTER

[75] Inventor: Horst Deininger, Hoerstein, Fed. Rep. of Germany

[73] Assignee: Linde Aktiengesellschaft, Fed. Rep. of Germany

[21] Appl. No.: 559,299

[22] Filed: Jul. 30, 1990

[30] Foreign Application Priority Data

Jul. 31, 1989 [DE] Fed. Rep. of Germany ....... 3925300

[51] Int. Cl.⁵ ............................................ G05D 16/20

[52] U.S. Cl. .......................... 137/625.18; 137/625.64; 137/625.62

[58] Field of Search ................ 137/82, 625.64, 625.62, 137/625.18; 251/129.08, 129.1

[56] References Cited

U.S. PATENT DOCUMENTS

| | | | |
|---|---|---|---|
| 2,983,278 | 5/1961 | Heintz | 251/129.1 X |
| 4,335,645 | 6/1982 | Leonard | 137/625.62 X |
| 4,352,367 | 10/1982 | Pollman | 137/625.62 X |
| 4,526,201 | 7/1985 | Geyler | 137/625.64 X |
| 4,682,629 | 7/1987 | Deininger | 137/625.4 |

FOREIGN PATENT DOCUMENTS

| | | | |
|---|---|---|---|
| 877523 | 5/1953 | Fed. Rep. of Germany | 47/29 |
| 1188398 | 4/1966 | Fed. Rep. of Germany | 47/29 |

*Primary Examiner*—Alan Cohan

*Attorney, Agent, or Firm*—Webb, Burden, Ziesenheim & Webb

[57] ABSTRACT

An electrohydraulic signal converter includes an armature which is movable in a magnetic field generated by field coils and is located between two inlet channel orifices that are provided with restrictors. Drain channels are connected downstream from the orifices and lead to a pressureless tank. The armature is connected to the orifices so that a pressure differential can be produced between the pair of inlet channels in the converter. In order to keep the loss of oil of the signal converter low, the orifices are closed when the armature is in its neutral or central position. When the armature is moved from its neutral position, the orifice away from the armature is opened and permits the flow of hydraulic oil from one inlet channel to a drain channel. The orifices are each formed by a borehole into which can be inserted a cylindrical projection on each front face of the armature.

5 Claims, 1 Drawing Sheet

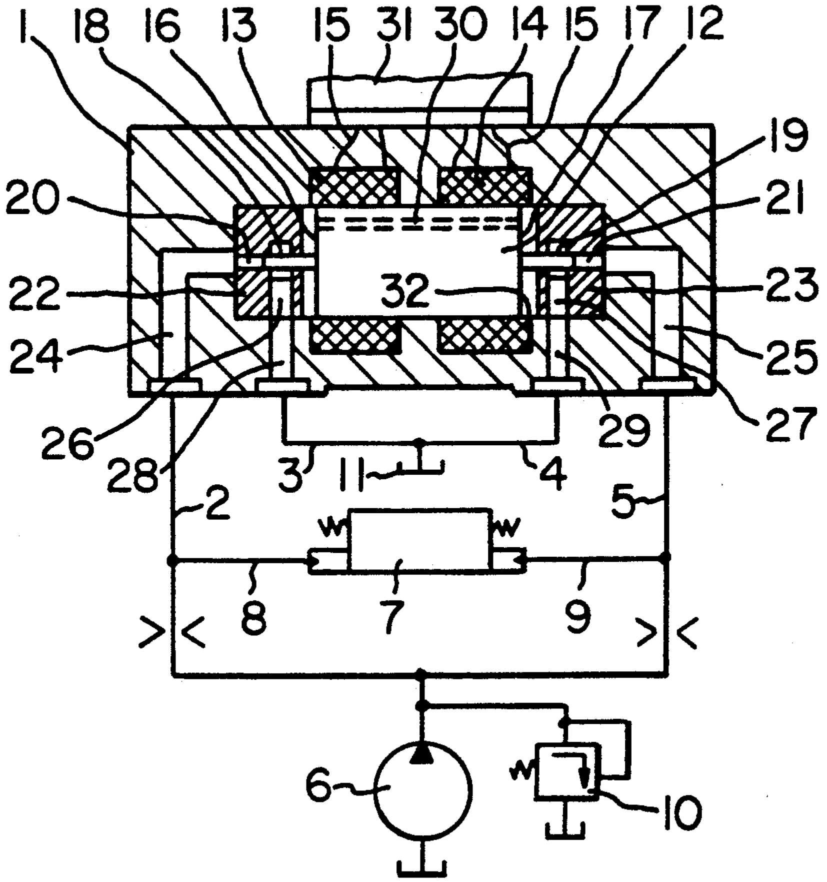
1
18
16
13
15
31
30
14
15
17
12
19
20
21
22
32
23
24
25
26
28
29
27
3
11
4
2
5
8
7
9
6
10

ELECTROHYDRAULIC SIGNAL CONVERTER

BACKGROUND OF THE INVENTION

1. Field of the Invention

This invention relates to electromagnetic valves and, more particularly, to an electrohydraulic signal converter.

2. Description of the Prior Art

U.S. Pat. No. 4,682,629 discloses an electrohydraulic signal converter, also known as an electromagnetic proportional valve, which has an armature moving between two inlet channel orifices in a magnetic field generated by a pair of field coils. The armature is effectively connected to restrictors located at the inlet channel orifices and at least one drain passage is provided downstream of the restrictors. The signal converter produces a control or actuating pressure depending on an electrical signal applied to the field coils. The control pressure may be used to control either a distributing valve, a pump that can be swung out in both directions beyond a neutral position, a motor of a hydrostatic gear, or the like.

In this known converter, a pair of field coils are arranged in a common housing and, in response to applied electrical signals, act upon the armature located within the coils and between two restrictors that are integrated in associated inlet channel orifices. As dictated by the direction of armature movement, the orifice cross-section of the restrictor in the direction of movement is reduced by the front end of the armature. This reduces the discharging oil volume as well as causes the pressure in the associated inlet channel to rise. The pressure differential between the two inlet channels can then be used for the control purposes discussed above.

This known signal converter has a disadvantage in that even when it is not actuated, there is a constant flow of hydraulic oil from both inlet channels through the discharge channel. In addition, the volume of the constant discharging oil stream must be relatively large so that when the signal converter is actuated, a high control pressure can be produced in one of the inlet channels within a short time period.

It is an object of the present invention to provide an electrohydraulic signal converter which has a reduced flow of discharging hydraulic oil.

SUMMARY OF THE INVENTION

In accordance with the present invention, the problem with prior art signal converters is solved by closing both restrictors when the armature is in a neutral position. When the field coils are deenergized, i.e., when the signal converter is not actuated, the drain channels in the signal converter are blocked and the same pressure prevails in both inlet channels. The armature moves from a neutral position in the selected direction only when current is applied to the field coils and in so doing opens, preferably, only the restrictor furthest away from the armature. This allows hydraulic oil to discharge and the pressure in the associated inlet channel to decrease. A pressure differential is produced between the two inlet channels and is proportional to the current applied to the field coils. If this pressure differential is supplied to a servo controller of a variable displacement pump, the pump swings out until an equilibrium is reached between the pressure differential and the spring force of the servo controller. Hydraulic oil does not flow unless the signal converter is energized, and then only at one of the restrictors and as a function of the pressure differential.

The restrictors are preferably formed by a borehole, with a cylindrical projection of the associated armature front face insertable into the borehole. The cylindrical projections are displaced longitudinally together with the armature to open a selected borehole. A signal converter can in this manner be produced simply and cost-effectively and will have substantially reduced flows of discharging hydraulic oil.

BRIEF DESCRIPTION OF THE DRAWING

The sole Figure is a cross-section of a preferred embodiment of an electrohydraulic signal converter in accordance with the present invention.

DETAILED DESCRIPTION OF THE PREFERRED EMBODIMENT

As shown in the Figure, the electrohydraulic signal converter of the present invention includes a housing 1 having four hydraulic connections 2, 3, 4 and 5 connected thereto. Hydraulic connections 2 and 5 are affixed to the outlet of a fixed displacement pump 6 which is driven, for example, rotationally synchronous with a variable displacement pump (not shown in the Figure). A spring-loaded servo controller 7 of the variable displacement pump is connected at its front ends via lines 8 and 9 to hydraulic connections 2 and 5, respectively. The fixed displacement pump 6 is protected by a pressure relief valve 10 connected thereto. Hydraulic connections 3 and 4 lead from housing 1 of the signal converter to a pressureless tank 11 which receives the flows of discharging hydraulic oil.

A recess 32, preferably hollow cylindrical in shape, is formed within the housing 1. An armature 12, preferably cylindrical in shape, is located in the recess 32 in the housing 1 and is longitudinally movable within the magnetic field of two electrically excitable field coils 13 and 14 positioned in the housing 1 and surrounding the recess 32 and the armature 12. The field coils 13 and 14 are connected via electric lines 15 to a suitable voltage source 31. The armature 12 has cylindrical projections 18 and 19 at its two opposed front faces 16 and 17 and as an extension of its center line. When the signal converter is in a neutral position, i.e., when the armature 12 is in its center position within the recess 32 of the housing 1, with the field coils 13 and 14 supplied with no current, the cylindrical projections 18 and 19 extend into and seal off inlet boreholes 20 and 21, respectively. Inlet boreholes 20 and 21 extend through housing inserts 22 and 23 positioned in the recess 32 at opposite ends thereof and form reduced-diameter orifices of inlet channels 24 and 25 in the housing 1. Inlet channel 24 leads to hydraulic connection 2 and inlet channel 25 leads to hydraulic connection 5. The housing inserts 22 and 23 include therethrough drain boreholes 26 and 27 downstream of and perpendicular to inlet boreholes 20 and 21. Drain boreholes 26 and 27 are connected to drain channels 28 and 29 which extend through the housing 1 and are in fluid communication with hydraulic connections 3 and 4, respectively. The armature 12 includes an axial bore 30 therethrough which establishes a fluid connection between its front faces 16 and 17.

The electrohydraulic signal converter of the present invention functions as follows: When the signal converter is not actuated, the field coils 13 and 14 have no current supplied thereto. The same pressure prevails both in hydraulic connections 2 and 4 as well as in lines 8 and 9. The armature 12 is located in its neutral position, i.e., in the center of the recess 32 between inlet boreholes 20 and 21 and seals inlet boreholes 20 and 21 with the cylindrical projections 18 and 19 extending therein. When the fixed displacement pump 6 reaches a certain delivery pressure, the pressure relief valve 10 opens and allows excess hydraulic oil to flow out. The front ends of the servo controller 7 are already under a sufficient pressure to facilitate a high rate of displacement.

In order to actuate the servo controller 7, a field coil 13 or 14 associated with the desired direction of control is electrically energized by the voltage source 31. This generates a magnetic field which moves the armature 12 longitudinally in the desired direction away from one of the inlet boreholes 20, 21. For example, if field coil 14 is energized, the armature 12 moves to the right as shown in the Figure. This movement causes cylindrical projection 18 on the left side of the armature 12 to disengage from inlet borehole 20 and hydraulic oil can flow through drain borehole 26 and drain channel 28 to hydraulic connection 3 and the pressureless tank 11. As a result, the pressure in inlet channel 24 and hydraulic connection 2 decreases.

The pressure differential now prevailing across the servo controller 7 causes the servo controller 7 to move to the left, as shown in the Figure, until an equilibrium is established between the prevailing pressure differential and the force of the spring counteracting the higher pressure in hydraulic connection 5. The pressure differential is dependent upon the restriction of the hydraulic oil flow at the gap between cylindrical projection 18 and inlet borehole 20 which, in turn, is dependent upon the position of the armature 12 and, thus, upon the magnitude of electrical excitation of field coil 14. A loss of oil due to flows through the drain channels 28, 29 occurs in the electrohydraulic signal converter of the present invention only when it is actuated, in which case oil flows only from one of the restrictors and through only one drain channel.

Having described above the presently preferred embodiment of the present invention, it is to be understood that it may be otherwise embodied within the scope of the appended claims.

I claim:

1. An electrohydraulic signal converter comprising a housing having a recess therein, a pair of inlet channels through said housing and communicating with each end of said recess, a pair of drain channels extending through said housing adjacent each end of said recess and communicating with said recess, orifices extending between each adjacent pair of inlet channels and drain channels, a pair of spaced field coils surrounding said recess, an armature in said recess and movable longitudinally therein, with said armature having opposed front faces with elongated projections extending outward therefrom, with the projections both extending into an associated orifice when the field coils are not energized and the armature is in a neutral position, and with one of said projections moved inwardly along said orifice and permitting fluid flow between an associated inlet channel and drain channel when the field coils are energized to move the armature in a desired direction.

2. The electrohydraulic signal converter of claim 1 wherein the orifices are formed of housing inserts positioned within said recess at each end thereof, with said housing inserts each including a first borehole therethrough which receives a projection on said armature and which is in fluid communication with an associated inlet channel, and including a second borehole therethrough which is in fluid communication with and extends between said first borehole and an associated drain channel.

3. The electromagnetic signal converter of claim 2 wherein said projections on said armature extend outwardly along the center line of said armature.

4. The electromagnetic signal converter of claim 2 wherein said recess, armature, projections and housing inserts are each cylindrical in shape.

5. The electromagnetic signal converter of claim 2 further including an axial borehole extending through said armature between said opposed front faces.

* * * * *